US012731035B2

(12) United States Patent
Xie et al.

(10) Patent No.: US 12,731,035 B2
(45) Date of Patent: Sep. 8, 2026

(54) LABEL INFERENCE IN SPLIT LEARNING DEFENSES

(71) Applicant: Lemon Inc., Grand Cayman (KY)

(72) Inventors: Shangyu Xie, Los Angeles, CA (US); Jiankai Sun, Los Angeles, CA (US); Xin Yang, Los Angeles, CA (US); Yuanshun Yao, Los Angeles, CA (US); Tianyi Liu, Los Angeles, CA (US); Taiqing Wang, Los Angeles, CA (US)

( * ) Notice: Subject to any disclaimer, the term of this patent is extended or adjusted under 35 U.S.C. 154(b) by 588 days.

(21) Appl. No.: 18/149,462

(22) Filed: Jan. 3, 2023

(65) Prior Publication Data

US 2023/0143789 A1 May 11, 2023

(51) Int. Cl.
*G06N 3/084* (2023.01)
*G06N 3/045* (2023.01)

(52) U.S. Cl.
CPC ............ *G06N 3/084* (2013.01); *G06N 3/045* (2023.01)

(58) Field of Classification Search
CPC .............................. G06N 3/084; G06N 3/045
USPC .......................................................... 706/15
See application file for complete search history.

(56) References Cited

U.S. PATENT DOCUMENTS

2020/0034665 A1* 1/2020 Ghanta .................... G06N 5/04
2021/0192357 A1* 6/2021 Sinha .................... G06N 3/094
2023/0039182 A1* 2/2023 Cheng .................... G06N 3/098
2023/0153461 A1* 5/2023 Kalra .................. G06F 21/6245 726/27
2023/0169325 A1* 6/2023 Xie .......................... G06N 3/09 706/15

OTHER PUBLICATIONS

Li et al., "Label Leakage and Protection in Two-party Split Learning", Computer Science, Machine Learning, arXiv:2102.08504, Submitted on Feb. 17, 2021 (v1), last revised May 24, 2022, https://arxiv.org/abs/2102.08504.

Sun et al., "Defending against Reconstruction Attack in Vertical Federated Learning", Computer Science, Machine Learning, arXiv:2107.09898, Submitted on Jul. 21, 2021, https://arxiv.org/abs/2107.09898.

* cited by examiner

*Primary Examiner* — Abdullah Al Kawsar
*Assistant Examiner* — Jun Kwon
(74) *Attorney, Agent, or Firm* — Fish & Richardson P.C.

(57) ABSTRACT

Split learning is provided to train a composite neural network (CNN) model that is split into first and second submodels, including receiving a noise-laden backpropagation gradient, training the surrogate submodel by optimizing a gradient distance loss, and computing an updated dummy label using the first submodel and the trained surrogate submodel to infer label information of the second submodel. Noise can be added to a label of the second submodel or a shared backpropagation gradient to protect the label information.

16 Claims, 4 Drawing Sheets

LABEL INFERENCE IN SPLIT LEARNING DEFENSES

TECHNICAL FIELD

The embodiments described herein pertain generally to split learning where multiple parties jointly train a machine learning model.

BACKGROUND

With the rising privacy concerns in machine learning, split learning techniques have emerged as one of main privacy-enhancing techniques (PETs). Split learning allows two or more parties to jointly train a machine learning model without disclosing either original data inputs or labels to each other.

SUMMARY

In accordance with one example embodiment, the present disclosure describes a split learning method to train a composite neural network (CNN) model split into a first submodel and a second submodel. The method includes receiving a noise-laden backpropagation gradient from a second submodel having a label, initializing a surrogate submodel and a dummy label of the surrogate submodel, training the surrogate submodel by optimizing a gradient distance loss representing a distance between the noise-laden original backpropagation gradient and a surrogate backpropagation gradient, and computing an updated dummy label using the first submodel and the trained surrogate submodel. The updated dummy label represents a prediction of the label of the second submodel.

In accordance with at least one other example embodiment, the present disclosure describes a split learning platform includes a pre-trained first submodel obtained by training a composite neural network (CNN) model that is split into a first submodel and a second submodel. The first submodel has an input feature, and the second submodel has a label corresponding to the input feature. The split learning platform includes a trained surrogate submodel having a dummy label corresponding to the input feature. The trained surrogate submodel is obtained by training another CNN model that is split into the first submodel and a surrogate submodel. The dummy label of the trained surrogate submodel represents a prediction of the label of the second submodel.

In accordance with at least one other example embodiment, a non-volatile computer-readable medium has computer-executable instructions stored thereon that, upon execution, cause one or more processors to perform operations that include receiving an original backpropagation gradient from a neural network model having a label in a split learning system, initializing a surrogate model having a dummy label, training the surrogate model to mimic the neural network model including optimizing a gradient distance loss to converge a surrogate backpropagation gradient from the surrogate submodel to the original backpropagation gradient from the neural network model, and computing an updated dummy label using the trained surrogate model. The updated dummy label represents a prediction of the label of the neural network model.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
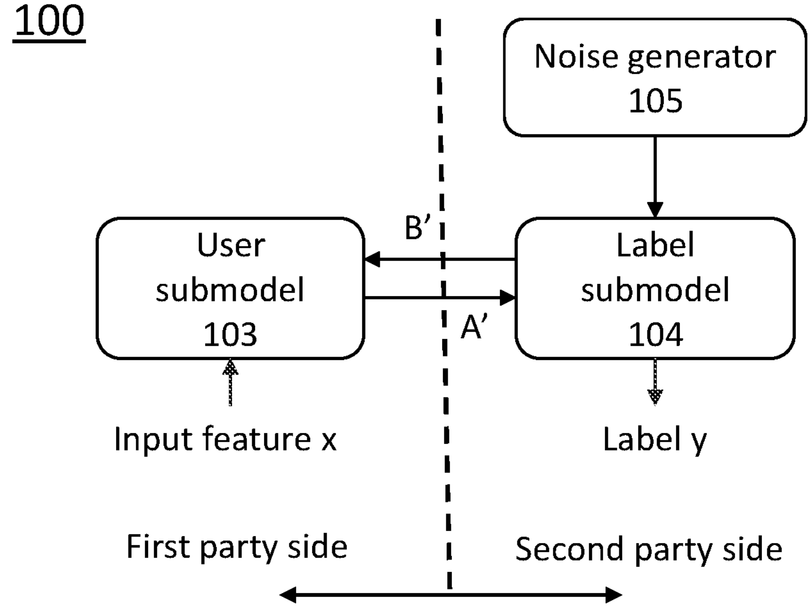
FIG. 1 shows a split learning system in which a split learning platform may be implemented, arranged in accordance with at least some embodiments described and recited herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described and recited herein, as well as illustrated in the drawings, may be arranged, substituted, combined, separated, and designed in a wide variety of different configurations, all of which are explicitly contemplated herein.

Additionally, portions of the present disclosure may be described herein in terms of functional block components and various processing steps. It should be appreciated that such functional blocks may be realized by any number of hardware and/or software components configured to perform the specified functions.

In the present description and recitation, the following terms may be used, in addition to their accepted meaning, as follows.

Machine learning, alternatively referenced herein as "ML," may refer to a learned or trained computer or processor-related technology by which decisions and/or actions are autonomously made, in place of human intervention. ML refers to software, i.e., algorithms and/or programs, hardware or firmware, or any combination thereof that supports machine learning, natural language understanding, natural language processing, speech recognition, computer vision, etc. Also included among the range of ML functions and capabilities, and pertinent to the embodiments disclosed, recited, and suggested herein, image generation and model training.

As referenced herein, a "model," a "platform," or a "framework" may refer to software, such as algorithms and/or programs, hardware or firmware, or any combination thereof that supports machine learning, natural language understanding, natural language processing, speech recognition, computer vision, etc.

As referenced herein, "split learning" may refer to a machine learning approach that allow multiple parties to collaboratively train and test machine learning models without sharing raw data with each other. Split learning may provide a machine learning model architecture that is split between the multiple parties. One example of split learning is two-party model training collaboration by which two parties (e.g., a user party and a label party) may collaboratively train a composite neural network (CNN) model that is split into a user model and a label model. One party (e.g., the user party) can own the user model and the features of data samples as an input of the user model. That is, information related to the user model and the input feature is under the control of the user party, which can prohibit or allow the sharing of certain information with other parties under certain privacy protocols. Another party can own the label model and the corresponding label as an output of the label model. That is, information related to the label model and the label is under the control of the label party, which can prohibit or allow the sharing of certain information with other parties under certain privacy protocols. Such two-party model training collaboration may be private considering the shared information is the forward embedding vectors and backpropagation gradients instead of private raw data and labels.

As referenced herein, a "surrogate label model," "surrogate model," or "surrogate submodel" may refer to a neural network model that is designed or trained to mimic the performance of another neural network model or submodel in split learning. An example surrogate label model may include a multilayer fully connected neural network (FCNN).

As referenced herein, "vertically partitioned data" may refer to datasets in split learning that share the same sample space but differ in the feature space.

As referenced herein, "horizontally partitioned data" may refer to datasets in split learning that share the same feature space but differ in the sample space.

As referenced herein, an "embedding," or "embeddings," alternatively referenced herein as "embedding vectors," or "forward embedding," may refer to a learned continuous vector representation of input variables in a machine learning model.

As reference herein, "backpropagation" may refer to an algorithm for training feedforward neural networks in a machine learning model. In fitting a neural network, backpropagation may compute the gradient of a loss function with respect to the weights of the neural network for an input—output example.

As referenced herein, "supervised learning" or "semi-supervised learning" may refer to a machine learning approach using, at least, partially labeled datasets. Supervised learning may be separated into two types of problems, including classification and regression. Classification problems may use an algorithm to assign test data into specific, discrete categories. Typical types of classification algorithms may include linear classifiers, support vector machines, decision trees, random forest, etc. Regression is another type of supervised learning approach that may use an algorithm to understand the relationship between dependent and independent variables. Regression models may predict continuous numerical values based on different data points, such as, for example, advertisement revenue prediction (e.g., the predicted revenue being continuous values), medical admission days prediction (e.g., the predicted days of medical admission being continuous numbers). Typical regression algorithms may include, for example, linear regression, logistic regression, polynomial regression, etc.

The present disclosure provides embodiments of label inference and defense in split learning addressing regression problems, by which the outputs or predictions associated with a composite neural network model are continuous, or the labels with regression have continuous values, instead of discrete categories in a classification problem.

An engine or generator, as disclosed, recited, and/or suggested herein, may refer to a type of software, firmware, hardware, or any combination thereof, that facilitates generation of source code or markup to produce elements that begin another process. In addition, or alternatively, an engine or generator may facilitate automated processes, in which various software elements interact to produce an intended product, whether physical or virtual based on natural language descriptions, inputs, or other prompts. In accordance with known ML technologies, the ML engines or generators disclosed, recited, and/or suggested herein are trained in accordance with either unimodal or multimodal training models.

A social media platform, as disclosed and recited herein, may refer to an application on which algorithms and/or programs enabling execution or implementation of a collection of communication-based or media-sharing technologies may be hosted. Further, any algorithm or program described, recited, or suggested herein may be executed by one or more processors hosted on such a platform. Non-limiting examples of such technologies may include the creation, sharing, and/or storage of multi-media offerings.

The present disclosure provides various embodiments of split learning that are provided to train a composite neural network (CNN) model that is split into first and second submodels. The embodiments include training a surrogate submodel by optimizing a gradient distance loss, and computing an updated dummy label using the first submodel and the trained surrogate submodel. The updated dummy label represents a prediction of the label of the second submodel. In other words, the trained surrogate submodel can infer the label of the second submodel by computing the updated dummy label.

By the non-limiting embodiments described and recited herein, when an original backpropagation gradient received from the second submodel is a noise-laden backpropagation gradient, the performance of the surrogate submodel to infer the label from the second submodel decreases, thus leading to increased protection of privacy (i.e., defense of label inference). The noise can be added by any optimized algorithm, for example, to a label of the second submodel, or to the original backpropagation gradient. In the meantime, adding noise may decrease the efficiency of collaboratively training the composite neural network (CNN) model (i.e., model utility or model performance). A balance between the protection of privacy (i.e., defense of label inference) and the model performance can be obtained by optimizing the algorithm to add the noise to preserve both privacy and utility for model training.

FIG. 1 shows a split learning system in which a label inference and defense platform may be implemented. Split learning system 100 provides a platform on which multiple parties (e.g., first party and second party) collaboratively train a machine learning model, e.g., a composite neural network (CNN) model. In the depicted embodiment of FIG. 1, the CNN model is split into multiple submodels, e.g., user submodel 103 and label submodel 104. A set of data points (x, y) can be provided to train the CNN model, with x representing raw data or input feature, and y representing a label for the corresponding raw data or input feature. The submodels 103, 104 may each include any suitable neutral network structures or architectures. It is to be understood that a model or submodel described herein may be initialized with any suitable neural network structures or architectures with any suitable initial parameters or weights of the network. In some cases, the user submodel 103 and the label submodel 104 may be independently constructed based on a prior-agreement regarding the best size and/or the dimension of layers of the neural networks.

The user submodel 103 may be owned by a first party (e.g., a user party), and can be trained by the first party, e.g., at a first computing device, with the raw data or input feature x. The first computing device can be any one or more designated processors within any one or more of computing devices, or computing networks such as, for example, a server or cluster of servers. The raw data or input feature x can be stored locally at the first party side, and can be accessible by the first computing device. With the raw data or input feature x, the user submodel 103 can initiate a forward pass phase of training by generating intermediate computation results (i.e., an embedding) of an intermediate layer thereof (i.e., a cut layer of the submodel 103), and send the intermediate computation results (i.e., a cut layer embedding) to the label submodel 104, as denoted by the arrow "A'" in FIG. 1. The intermediate computation results or the cut layer embedding may include, for example, continuous vector representations of the raw data or input feature x.

The label submodel 104 can be owned by a second party (e.g., a label party), and can be trained, e.g., at a second computing device by receiving the intermediate computation results (e.g., the embedding) from the user submodel 103 as an input. The second computing device can be any one or more designated processors within any one or more of computing devices or computing networks such as, for example, a server or cluster of servers. The second computing device can be in communication with the first computing device to collaboratively train the composite neural network (CNN) model. The label party may locally store the label y for the corresponding raw data or input feature x, and make the label y accessible by the second computing device. Under certain training protocol between the user party and the label party, the second computing device (e.g., at the label party side) may not have access to the raw data or input feature x, while the first computing device (e.g., at the user party side) may not have access to the label y. In addition, the first and second computing devices may not communicate with each other regarding the network structures or architectures of the submodels 103, 104.

After receiving the intermediate computation results from the user submodel 103, the label submodel 104 continues the forward pass phase of training by computing an output (e.g., a prediction of the label submodel 104). The output (e.g., the prediction of the label submodel 104) can be compared to the label y at the second computing device to derive a loss for such a prediction. The label submodel 104 can then start a backpropagation phase of training by computing a gradient of the loss with respect to the label submodel 104 itself to update the associated parameters in the label submodel 104. The label submodel 104 can also compute, e.g., by a chain rule, a shared gradient of the loss with respect to the cut layer embedding of the user submodel 103, and send the shared gradient back to the user submodel 103, as denoted by the arrow "B'" in FIG. 1. With the received shared gradient, the user submodel 103 can complete the backpropagation phase of training by computing a gradient update with respect to parameters in the submodel 103 to update the user submodel 103.

By repeatedly using the forward pass and backpropagation phases of training with the set of data points (x, y), the composite neural network (CNN) model including the user submodel 103 and the label submodel 104 can be iteratively updated to obtain the respective trained submodels 103 and 104, which can be combined to form a trained CNN model.

After the training of the CNN model is completed, the trained user submodel 103 can compute, e.g., at the first computing device, the intermediate computation results (i.e., the cut layer embedding) by feeding the input feature x into the trained user submodel 103. The user submodel 103 then sends the cut layer embedding to the trained label submodel 104 as an input, which can compute the final prediction corresponding to the input feature x.

In some cases, before the original backpropagation gradient being sent from the label submodel 104 to the user submodel 103 for backpropagation, noise can be added, via a noise generator 105 implemented, e.g., by the second computing device, to the original backpropagation gradient to form a noise-laden backpropagation gradient. Sharing a noise-laden gradient instead of an original gradient with another party can provide privacy protection of the label owned by the label party. In other words, it is more difficult for another party to predict or infer the label by using the shared noise-laden gradient than using the shared original gradient. The noise can be randomly generated by using differentially private machine learning algorithms such as, for example, Laplace noise, or Gaussian noise. The Gaussian noise can be sampled from a suitable distribution including, for example, a standard Gaussian distribution. The second computing device then sends the noise-laden backpropagation gradient to the user submodel 103. With the received noise-laden backpropagation gradient, the user submodel 103 can complete the backpropagation phase of training by computing a gradient update with respect to parameters in the submodel 103 to update the user submodel 103.

In some cases, noise can be added, via the noise generator 105, directly to the label y at the side of the label submodel 104 to obfuscate the label y. The formed noise-laden label is more difficult for another party to predict or infer, and thus provides privacy protection of the label owned by the label party. The added noise may be randomly sampled from a noise distribution such as, for example, Laplace noise. The added noise N can be represented by equation of $N=Lap(s/\epsilon)$, where the sensitivity s is the maximum values of the label y, and $\epsilon$ is the value of scale representing the amount of noise to be added. The prediction of the label submodel 104 can be compared to the noise-laden labels to derive a noise-laden loss for such a prediction and compute a shared gradient of the noise-laden loss (i.e., a noise-laden backpropagation gradient) with respect to the cut layer embedding of the user submodel 103. The noise-laden backpropagation gradient can be sent back to the user submodel 103 for backpropagation training of the user submodel 103.

It is to be understood that, while adding noise to the label y or to the original backpropagation gradient can protect the privacy of the label y at the label side, the efficiency of collaboratively training the composite neural network (CNN) model (i.e., utility of the model) may decrease. In some cases, a balance between the training efficiency and the protection of privacy can be obtained by, e.g., adjusting parameters in a process of adding the noise. For example, the value $\epsilon$ of scale representing the amount of noise to be added can be tuned with a value between 0 and 10, where the value "0" represents no protection of privacy and the value "10" represents a maximum protection of privacy that can be achieved during the training of the CNN model.

In some cases, the split learning system 100 can be implemented with a federated learning (FL) mechanism that includes multiple, independent computing devices (e.g., the first and second computing devices) that each train a submodel (e.g., the user submodel 103, the label submodel 104) on local computing devices using data stored at or accessible by the respective local computing devices. The submodels can be combined to form a centralized model (e.g., the composite neural network or CNN model). In the federated learning mechanism, data in each computing device can adhere to data privacy policies, which can protect private data from possible data leakage or breach. For example, in the split learning system 100 of FIG. 1, the user party may store the raw data or input feature x at the first computing device without sharing it with the label party, and the label party may store the labels y at the second computing device without sharing it with the user party. The first and second computing devices are independent from each other and are in communication with each other to exchange information/data necessary for the cooperative training of the composite neural network (CNN) model including, e.g., the user submodel 103, and the label submodel 104. In the embodiment of FIG. 1, the exchanged information/data includes, e.g., the computation results (e.g., the cut layer embedding) sent from the user submodel 103 to the label submodel 104, and the shared gradient sent from the label submodel 104 to the user submodel 103, as denoted by the arrows "A'" and "B'" in FIG. 1, respectively.

In some cases, the split learning system 100 can be implemented with a vertical federated learning (vFL) mechanism by which datasets are vertically partitioned among multiple parties to share the same sample space but differ in the feature space. One example implementation of the split learning system 100 using vFL is a collaboration between a general hospital and a specialized hospital to train a composite model. The composite model can be split into two submodels that are each owned by one party. The two parties may own different medical data (i.e., different feature spaces) for the same patient (i.e., the same sample space). For example, the general hospital may own generic information (e.g., private attributes such as gender and age) of a patient, and the specialized hospital may own specific testing results of the same patient. The general hospital may act as a user party in the split learning system 100 to train a user submodel by feeding the generic information as the input feature x. The specialized hospital may act as a label party in the split learning system 100 to train a label submodel with the specific testing results being the labels y. In this manner, the general hospital and the specialized hospital may jointly train the composite neural network model that predicts a specific disease of the patient without sharing the patient's private data (e.g., the patent's generic information owned by the general hospital, and the specific testing results owned by the specialized hospital).

In some cases, the split learning system 100 can be implemented to address regression types of problems in supervised machine learning algorithms. The embodiments described and recited herein provide split learning under regression problems, by which an output of a label submodel (e.g., output scores, predictions, etc.) has continuous values, instead of discrete categories. In other words, the label with regression has continuous values. Statistic information of the continuous values such as a range, a mean, a maximum, a minimum, etc., may not be available.

One example implementation of the split learning system 100 to address a regression problem is for two parties (e.g., a social media platform and an e-commerce company) to collaboratively train a composite model to predict how much money a user will spend on purchasing a product from the e-commerce company. In this example, the user on the online media platform can be shown an advertisement of the product. When the user clicks the advertisement, the user can be directed to a product page of the e-commerce company's website to make a purchase. The composite model can be split into two submodels, respectively owned by the social media platform and the e-commerce company. The two parties may own different commercial data (i.e., different feature spaces) for the same user (i.e., the same sample space). For example, the media platform may own a user's general information (e.g., the user's interest, the user's viewing history, etc.), and the e-commerce company may own specific purchasing information for the same user (e.g., how much money the user spent on purchasing the products). The online media platform may act as a user party in the split learning system 100 to train a user submodel by feeding the user's general information as the input feature x. The e-commerce company may act as a label party in the split learning system 100 to train a label submodel with the values of purchasing money being the continuous labels y. In this manner, the media platform and the e-commerce company may jointly train the composite model that predicts a value of the user's purchasing money without sharing their private data (e.g., the user's general information owned by the online media platform, and the user's purchasing information owned by the e-commerce company).

While one user submodel 103 and one label submodel 104 are illustrated in the embodiment of FIG. 1, it is to be understood that the split learning system 100 may include multiple user parties and/or multiple label parties each having a submodel that is split from one or more composite neural network (CNN) models. The multiple user parties may each have a user submodel configured to send intermediate computation results (i.e., a cut layer embedding) to one or more label submodels and receive a shared gradient from the corresponding label submodel(s). The multiple label parties may each have a label submodel to receive the intermediate computation results (i.e., the cut layer embedding) from one or more user submodels and send the shared gradient to the corresponding user submodel(s). In some cases, the multiple user/label parties are independent from each other and do not share information/data with each other.

Figure 2:
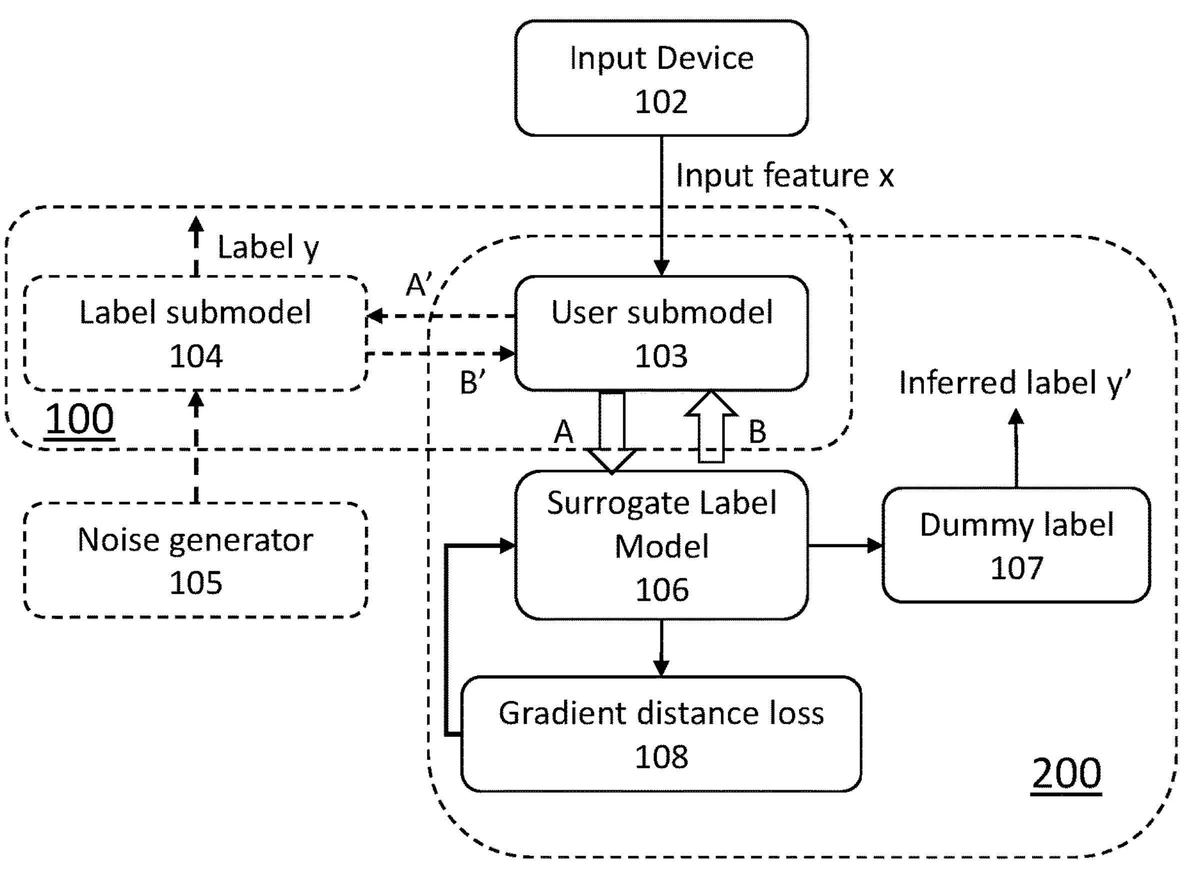
FIG. 2 shows a split learning platform in which label inference and the associated defenses may be implemented, arranged in accordance with at least some embodiments described and recited herein.

FIG. 2 illustrates a split learning platform 200 for label inference and defense in the split learning system 100, arranged in accordance with at least some embodiments described and recited herein. As depicted, raw data or input feature x are provided from the input device 102 to the split learning platform 200. The split learning platform 200 utilizes a composite neural network (CNN) model that includes the user submodel 103 and a surrogate submodel 106 with dummy label 107. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

Input device 102 may refer to one or more embodiments of a classical computing device that may be, or include, a classical computer, processing device, a microprocessor, a microcontroller, a digital signal processor, or any combination thereof. Further, any algorithm or program described, recited, or suggested herein may be executed by one or more processors hosted on input device 102.

Input feature x, in accordance with at least some of the embodiments disclosed and recited herein, may refer to raw data that may be input manually or in an automated manner to an appropriate input interface. Input feature x may be transmitted or otherwise communicated from input device 102 to a receiving component corresponding to a split learning platform 200 via a wired or wireless network. The network may include the Internet, a local area network (LAN), a wide area network (WAN), a local interconnect network (LIN), a localized cloud, etc.

The split learning platform 200 may refer to, e.g., a machine learning platform, for which is implemented an application on which algorithms and/or programs enabling execution of a collection of machine learning or training technologies may be hosted. In some cases, the split learning platform 200 may be hosted by a first computing device which may include, for example, one or more processors designated in any one or more of computing devices or computing networks such as, for example, a server or cluster of servers.

As set forth above, the use of the same reference numbers in different figures indicates similar or identical items. Thus, the description of FIG. 2 incorporates that of FIG. 1.

The user submodel 103 of the split learning platform 200 can be one of the submodels that are split from a composite neural network (CNN) in the split learning system 100, by which the user submodel 103 and the label submodel 104 can be collaboratively trained such as described above for FIG. 1.

The surrogate submodel 106 of the split learning platform 200 is constructed and trained to mimic the performance of the label submodel 104 in the split learning system 100. In some cases, the surrogate submodel 106 may be initialized to have substantially the same model architecture as a target neural network model (e.g., the label submodel 104) and with random-initialized parameters of the network. In some cases, the model architecture of the target neural network model may not be available; and the surrogate submodel 106, along with the dummy label 107 thereof, may have any random initializations including, for example, to provide random parameters to a suitable neural network model as a surrogate submodel, and to provide random initial values to the dummy label. The initialized surrogate submodel and its dummy label can be iteratively updated during a training by the split learning platform 200, which will be described further below.

In an example training process for the surrogate submodel 106, the user submodel 103 can initiate a forward pass phase of training by generating intermediate computation results (i.e., a cut layer embedding) of an intermediate layer thereof (i.e., a cut layer of the user submodel 103), and send the intermediate computation results (i.e., the cut layer embedding) to the surrogate submodel 106, as denoted by the arrow “A” in FIG. 2. The intermediate computation results (i.e., the cut layer embedding) may include, for example, continuous vector representations of the raw data or input feature x. After receiving the intermediate computation results from the user submodel 103, the surrogate submodel 106 continues the forward pass phase of training by computing an output (e.g., a prediction of the surrogate submodel 106), which can be compared to the dummy label 107 to derive a loss for such a prediction. The surrogate submodel 106 can then initiate a backpropagation phase of training by computing, for example, via a chain rule, a gradient of the loss with respect to the cut layer embedding of the user submodel 103 to derive a surrogate backpropagation gradient, and send the surrogate backpropagation gradient back to the user submodel 103, as denoted by the arrow “B” in FIG. 2.

As described above for FIG. 1, the user submodel 103 also receives an original backpropagation gradient from the label submodel 104, as denoted by the arrow “B'” in FIG. 1 or FIG. 2. In some cases, the original backpropagation gradient from the label submodel 104 may be a noise-laden backpropagation gradient, for which noise may be added, via the noise generator 105, to the label y or the original backpropagation gradient before sending the backpropagation gradient to the user submodel 103.

By utilizing the received original backpropagation gradient (or noise-laden backpropagation gradient in some cases) B' from a target neural network model (e.g., the label submodel 104 in this embodiment) and the surrogate backpropagation gradient B from the surrogate submodel 106, the split learning platform 200 can implement various training or learning processes to iteratively update the surrogate submodel 106 and its dummy label 107 such that the trained surrogate submodel 106 can mimic the performance of the target neural network model (e.g., the label submodel 104). As described herein, for a surrogate submodel to mimic the performance of a target neural network model, the surrogate submodel may generate substantially the same results as by the target neural network model. For example, a trained surrogate submodel may generate at least one of (i) a surrogate backpropagation gradient substantially converged to an original backpropagation gradient from the target neural network model, and (ii) a prediction that is substantially the same as that of the target neural network model, i.e., to infer a label of the target neural network model.

The split learning platform 200 can compare the original backpropagation gradient B' from the label submodel 104 and the surrogate backpropagation gradient B from the surrogate submodel 106 and utilize the comparison information to iteratively update the surrogate submodel 106 and its dummy label 107. Inferred labels y' can be determined based on the updated dummy label 107 when the surrogate backpropagation gradient converges to the original backpropagation gradient from the second submodel. For example, the split learning platform 200 may calculate and optimize a gradient distance loss 108 which represents a distance between the original backpropagation gradient B' from the label submodel 104 and the surrogate backpropagation gradient B from the surrogate submodel 106. The distance may be, for example, an L2 norm function, which can work with a batch of data and can be scaled to large datasets. It is to be understood that the surrogate submodel 106 and its dummy label 107 can be iteratively updated or optimized by any suitable gradient-based algorithms such as, for example, the Adam algorithm.

In some cases, the split learning platform 200 may apply one or more learning regularizations in addition to the gradient distance loss to improve the training of the surrogate submodel 106 to better mimic the performance of the label submodel 104 and predict more accurate label information for the respective raw data or input feature.

One example of learning regularization is to optimize or minimize a model training accuracy loss representing a difference between predictions of the surrogate submodel and the dummy label. Using the model training accuracy loss as a regularization of training can help updating the surrogate submodel to generate more accurate predictions by converging the generated predictions to the correspondingly updated dummy label. In one example, the model training accuracy loss may refer to a function of the difference between predictions of the surrogate submodel and the dummy label, e.g., a square of absolute value of the difference. It is to be understood that the model training accuracy loss may have other forms of functions suitable for characterizing the difference between predictions of the surrogate submodel and the dummy label. After the optimization process, a prediction generated by the trained surrogate submodel can be close to or substantially equal to the updated dummy label when the surrogate submodel is converged. In other words, the predictions of a trained surrogate submodel can substantially match its updated dummy label.

Another example of learning regularization is to optimize or minimize a knowledge learning loss using an auxiliary set of raw data with known labels as the input feature. The knowledge learning loss can be determined based on the gradient distance loss and the model training accuracy loss for the auxiliary set of raw data with known labels. The auxiliary set of raw data with known labels may refer to a small set of training data points with known labels owned by a user party to train the surrogate submodel. The number of training data points with known labels may be, for example, less than at or about 10%, less than at or about 5%, less than at or about 2%, or even less than at or about 1% of the total training data points. In some cases, the knowledge learning loss can be an aggregating loss of the gradient distance loss and the accuracy loss with the ground truth labels of the small set of training data points with known labels.

Yet another example of learning regularization is to optimize or minimize an overall learning loss function. The overall learning loss function may refer to a function of the gradient distance loss, the model training accuracy loss, and the knowledge learning loss. In one example, the overall learning loss function can be a weighted sum of the gradient distance loss, the model training accuracy loss, and the knowledge learning loss, where the different kinds of losses may have their respective weight parameters to balance the overall learning loss.

By the non-limiting embodiments described and recited herein, using the gradient distance loss, one or more additional learning regularizations, and a combination thereof to train a surrogate submodel has a better performance than a benchmark or baseline training method. The benchmark or baseline training method uses the auxiliary set of raw data with known labels to directly train the surrogate submodel with standard supervised or semi-supervised learning algorithms to infer labels for an input feature. While not wanting to be bound by theory, it is reasonably assumed that the small set of training data points with known labels (e.g., known data samples) in the benchmark or baseline training method may not have enough number to fine-tune the surrogate submodel to mimic the performance of a label submodel.

Any one or more of a server or cluster of servers upon which the split learning platform 200 is hosted and, therefore, split learning is implemented, may refer to a high-performance computing (HPC) environment that includes, at least, a CPU and GPU that is present on a, e.g., a video card, embedded on a motherboard, or on the CPU die. The training and/or resulting automatic data generation, i.e., dataset expansion, may be executed entirely on the CPU or in part on the CPU and the GPU. Alternative embodiments may be executed in evolved HPC components known in the art. Regardless, the CPU, GPU, and/or HPC components may store one or more algorithms and/or programs that, when executed thereon, may cause the execution or performance of operations and/or functionality as disclosed and/or recited herein. Also, a computer-readable non-volatile medium may be provided according to the embodiments described herein. The computer readable medium stores computer programs. The computer programs are used to, when being executed by a processor, execute or perform the operations or functionality in connection with at least the embodiments described and recited herein.

Figure 3:
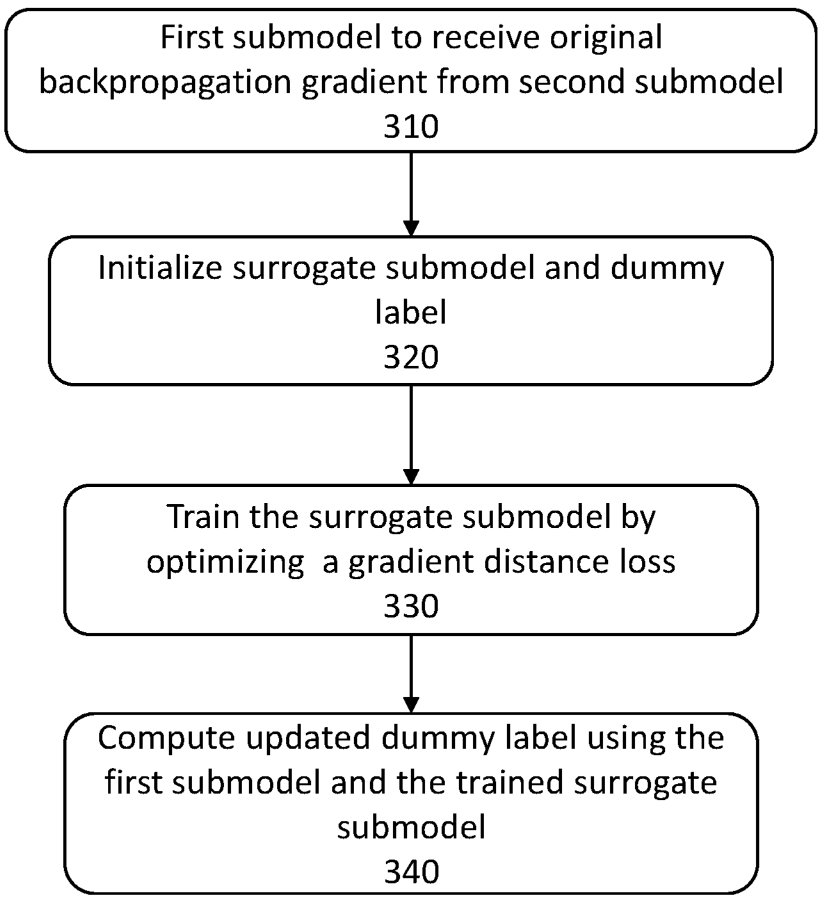
FIG. 3 shows an example processing flow for implementation of training a split learning model, in accordance with at least some embodiments described and recited herein.

FIG. 3 shows an example processing flow for implementation of split learning method to train a composite neural network (CNN) model, in accordance with at least the embodiment of FIG. 2, described and recited herein. As depicted, processing flow 300 includes operations or sub-processes executed by various components of the split learning platform 200 including a user submodel and a surrogate submodel, as shown and described in connection with FIG. 2. However, processing flow 300 is not limited to such components and processes, as obvious modifications may be made by re-ordering two or more of the sub-processes described here, eliminating at least one of the sub-processes, adding further sub-processes, substituting components, or even having various components assuming sub-processing roles accorded to other components in the following description.

Processing flow 300 may include various operations, functions, or actions as illustrated by one or more of blocks 310, 320, 330, and 340. These various operations, functions, or actions may, for example, correspond to software, program code, or program instructions executable by a processor that causes the functions to be performed. Processing may begin at block 310.

At block 310, a first submodel 103 receives an original backpropagation gradient from a second submodel 104. The first submodel and the second submodel may be split from a composite neural network (CNN) model trained by a split learning system such as, e.g., the split learning system 100 of FIG. 1 or 2. The first submodel may be owned by a first party (e.g., a user party), and can be trained by the first party, e.g., at a first computing device with raw data or input feature x, as shown in FIG. 1 or 2. The second submodel can be owned by a second party (e.g., a label party), and can be trained, e.g., at a second computing device by taking intermediate computation results (i.e., a cut layer embedding) from the first submodel as an input. The second submodel (trained or undertraining) can compute a shared gradient (i.e., the original backpropagation gradient) with respect to the cut layer embedding of the first submodel, and send the shared gradient back to the first submodel. Processing 300 then proceeds to block 320.

In some cases, noise can be added, via the noise generator 105 directly to the label of the second submodel, or to the original backpropagation gradient to be sent from the second submodel to the first submodel, to form a noise-laden backpropagation gradient. With the received shared gradient (e.g., the noise-laden backpropagation gradient), the user submodel 103 can complete the backpropagation phase of training by computing a gradient update with respect to parameters in the submodel 103 to update the user submodel 103.

At block 320, a split learning platform 200 initializes a surrogate submodel and dummy label as ground truth outputs for the surrogate submodel. The surrogate submodel can be constructed and trained by the split learning platform 200 to mimic the performance of the second submodel 104 in a split learning system. In some cases, the surrogate submodel, along with its dummy label may have any random initializations (e.g., to provide random parameters to a suitable neural network model as the surrogate submodel, and provide random, continuous initial values to the dummy label). Processing then proceeds to block 330.

At block 330, the surrogate submodel is trained, e.g., via the split learning platform 200, by optimizing a gradient distance loss. During the training, the surrogate submodel receives intermediate computation results (i.e., a cut layer embedding) from the first submodel and computes the corresponding surrogate backpropagation gradient with respect to the cut layer embedding of the first submodel. The split learning platform 200 can compare the surrogate backpropagation gradient to the original backpropagation gradient (or noise-laden backpropagation gradient in some cases) shared by the second submodel (e.g., the label submodel 104 in FIG. 1 or 2) and utilize the comparison information to iteratively update the surrogate submodel and its dummy label. The split learning platform 200 calculates and optimizes the gradient distance loss to train the surrogate submodel. The gradient distance loss represents a distance between the original backpropagation gradient and the surrogate backpropagation gradient from the surrogate submodel. Processing 300 then proceeds to 340.

In some cases, the original backpropagation gradient received by the split learning platform 200 may be a noise-laden gradient where noise may be added to the original backpropagation gradient or the label of the second submodel. For example, as illustrated in the embodiment of FIG. 2, the noise generator 105 is configured to add noise to at least one of the original backpropagation gradient B' and the label y before sending the backpropagation gradient to the first submodel of the split learning platform 200.

At block 340, the split learning platform 200 computes the dummy label using the first submodel and the trained surrogate submodel. The trained surrogate submodel can generate predictions that are substantially equal to the updated dummy label when the surrogate submodel is converged (e.g., the predictions substantially match the dummy label). Accordingly, for the same input feature x from the first submodel, the trained surrogate submodel can generate predictions that are substantially close to the label of the second submodel. In other words, the trained surrogate submodel can infer the label y of the second submodel by computing its own dummy label as the inferred label y', as illustrated in the embodiment of FIG. 2.

Figure 4:
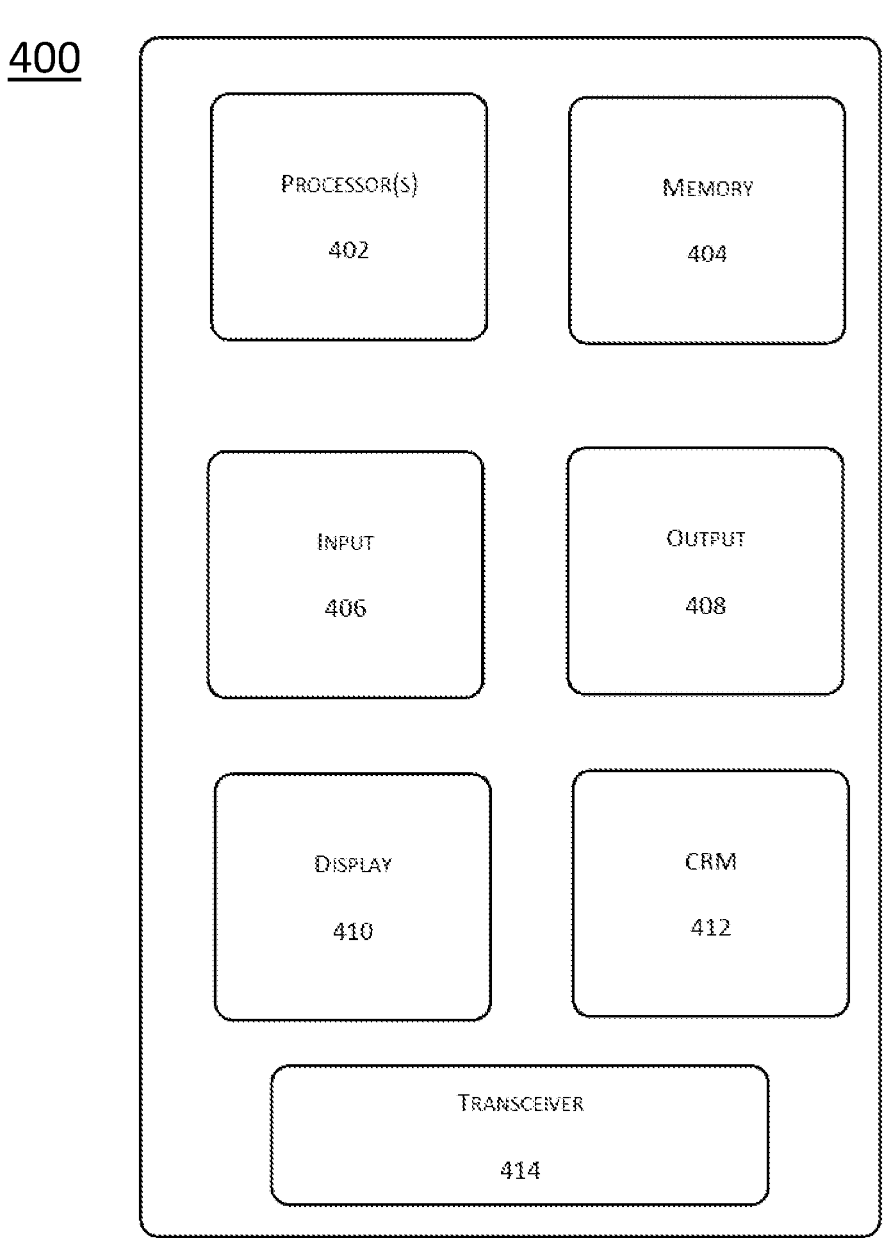
FIG. 4 shows an illustrative computing embodiment, in which any of the processes and sub-processes for split learning may be implemented as executable instructions stored on a non-volatile computer-readable medium.

FIG. 4 shows an illustrative computing embodiment, in which any of the processes and sub-processes of label inference in split learning defenses may be implemented as executable instructions stored on a non-volatile computer-readable medium. The computer-readable instructions may, for example, be executed by a processor of a device, as referenced herein, having a network element and/or any other device corresponding thereto, particularly as applicable to the applications and/or programs described above corresponding to system 100 to implement label inference in split learning defenses.

In a very basic configuration, a computing device 400 may typically include, at least, one or more processors 402, a memory 404, one or more input components 406, one or more output components 408, a display component 410, a computer-readable medium 412, and a transceiver 414.

Processor 402 may refer to, e.g., a microprocessor, a microcontroller, a digital signal processor, or any combination thereof.

Memory 404 may refer to, e.g., a volatile memory, non-volatile memory, or any combination thereof. Memory 404 may store, therein, an operating system, one or more applications corresponding to media platform 105 and/or program data therefore. That is, memory 404 may store executable instructions to implement any of the functions or operations described above and, therefore, memory 404 may be regarded as a computer-readable medium.

Input component 406 may refer to a built-in or communicatively coupled keyboard, touch screen, telecommunication device, i.e., smartphone, and/or a microphone that is configured, in cooperation with a voice-recognition program that may be stored in memory 404, to receive voice commands from a user of computing device 400. Further, input component 406, if not built-in to computing device 400, may be communicatively coupled thereto via short-range communication protocols including, but not limitation, radio frequency or Bluetooth®.

Output component 408 may refer to a component or module, built-in or removable from computing device 400, that is configured to output commands and data to an external device.

Display component 410 may refer to, e.g., a solid state display that may have touch input capabilities. That is, display component 410 may include capabilities that may be shared with or replace those of input component 406.

Computer-readable medium 412 may refer to a separable machine-readable medium that is configured to store one or more programs that embody any of the functions or operations described above. That is, computer-readable medium 412, which may be received into or otherwise connected to a drive component of computing device 400, may store executable instructions to implement any of the functions or operations described above. These instructions may be complimentary or otherwise independent of those stored by memory 404.

Transceiver 414 may refer to a network communication link for computing device 400, configured as a wired network or direct-wired connection. Alternatively, transceiver 414 may be configured as a wireless connection, e.g., radio frequency (RF), infrared, Bluetooth®, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Aspects

Aspect 1. A split learning method to train a composite neural network (CNN) model split into a first submodel and a second submodel, the method comprising:

receiving a noise-laden backpropagation gradient from a second submodel having a label;

initializing a surrogate submodel and a dummy label of the surrogate submodel;

training the surrogate submodel by optimizing a gradient distance loss representing a distance between the noise-laden original backpropagation gradient and a surrogate backpropagation gradient; and computing an updated dummy label using the first submodel and the trained surrogate submodel, the updated dummy label representing a prediction of the label of the second submodel.

Aspect 2. The method of Aspect 1, further comprising forming the noise-laden backpropagation gradient by adding noise to the label of the second submodel.

Aspect 3. The method of Aspect 1 or 2, further comprising forming the noise-laden backpropagation gradient by adding noise to an original backpropagation gradient from the second submodel.

Aspect 4. The method of any of Aspects 1-3, wherein the dummy label of the surrogate submodel has continuous values.

Aspect 5. The method of any of Aspects 1-4, wherein the first submodel is trained at a first computing device with a set of raw data as an input feature of the CNN model, and the second submodel is trained at a second computing device with the label as an output of the CNN model for the input feature.

Aspect 6. The method of any of Aspects 1-5, wherein the training of the surrogate submodel further comprises computing the surrogate backpropagation gradient with respect to intermediate computation results from the first submodel.

Aspect 7. The method of any of Aspects 1-6, wherein the training of the surrogate submodel further comprises optimizing a model training accuracy loss representing a difference between predictions of the surrogate submodel and the dummy label.

Aspect 8. The method of Aspect 7, wherein the training of the surrogate submodel further comprises optimizing a knowledge learning loss using an auxiliary set of raw data with known labels as the input feature, the knowledge learning loss being determined based on the gradient distance loss and the model training accuracy loss for the auxiliary set of raw data with known labels.

Aspect 9. The method of Aspect 8, wherein the training of the surrogate submodel further comprises optimizing an overall learning loss as a function of the gradient distance loss, the model training accuracy loss, and the knowledge learning loss.

Aspect 10. The method of any of Aspects 1-9, wherein the optimizing of the gradient distance loss further comprises converging the surrogate backpropagation gradient to the noise-laden original backpropagation gradient using a gradient-based algorithm.

Aspect 11. A split learning platform comprising:

a pre-trained first submodel obtained by training a composite neural network (CNN) model that is split into a first submodel and a second submodel, the first submodel having an input feature, and the second submodel having a label corresponding to the input feature; and a trained surrogate submodel having a dummy label corresponding to the input feature, the trained surrogate submodel being obtained by training another CNN model that is split into the first submodel and a surrogate submodel, and the dummy label of the trained surrogate submodel representing a prediction of the label of the second submodel.

Aspect 12. The split learning platform of Aspect 11, wherein the dummy label has continuous values.

Aspect 13. The split learning platform of Aspect 11 or 12, wherein the trained surrogate submodel converges a surrogate backpropagation gradient to an original backpropagation gradient from the second submodel.

Aspect 14. The split learning platform of Aspect 13, wherein the original backpropagation gradient is a noise-laden backpropagation gradient.

Aspect 15. A non-volatile computer-readable medium having computer-executable instructions stored thereon that, upon execution, cause one or more processors to perform operations comprising:

receiving an original backpropagation gradient from a neural network model having a label in a split learning system;

initializing a surrogate model having a dummy label;

training the surrogate model to mimic the neural network model, comprising optimizing a gradient distance loss to converge a surrogate backpropagation gradient from the surrogate submodel to the original backpropagation gradient from the neural network model; and computing an updated dummy label using the trained surrogate model, the updated dummy label representing a prediction of the label of the neural network model.

Aspect 16. The non-volatile computer-readable medium of Aspect 15, wherein the dummy label has continuous values.

Aspect 17. The non-volatile computer-readable medium of Aspect 15 or 16, wherein training the surrogate model further comprises optimizing a model training accuracy loss representing a difference between predictions of the surrogate model and the dummy label.

Aspect 18. The non-volatile computer-readable medium of Aspect 17, wherein the training of the surrogate model further comprises optimizing a knowledge learning loss using an auxiliary set of raw data with known labels as the input feature, the knowledge learning loss being determined based on the gradient distance loss and the model training accuracy loss for the auxiliary set of raw data with known labels.

Aspect 19. The non-volatile computer-readable medium of Aspect 18, wherein the training of the surrogate model further comprises optimizing an overall learning loss as a function of the gradient distance loss, the model training accuracy loss, and the knowledge learning loss.

Aspect 20. The non-volatile computer-readable medium of any of Aspects 15-19, wherein the original backpropagation gradient is a noise-laden backpropagation gradient.

What is claimed:

1. A split learning method to train a composite neural network (CNN) model split into a first submodel and a second submodel, the method comprising:

receiving, by the first submodel, a noise-laden backpropagation gradient from the second submodel, wherein the second submodel has a label, and the noise-laden backpropagation gradient is obtained by the second submodel with respect to intermediate computation results received from the first submodel, wherein the noise-laden backpropagation gradient is formed by adding noise to the label of the second submodel or by adding noise to an original backpropagation gradient from the second submodel, and the intermediate computation results are generated by the first submodel based on an input feature;

initializing a surrogate submodel to have a same model architecture as the second submodel, wherein the surrogate submodel has a dummy label as a ground truth output for the surrogate submodel, and the dummy label of the surrogate submodel has continuous values;

receiving, by the surrogate submodel, the intermediate computation results from the first submodel and determining a surrogate backpropagation gradient with respect to the intermediate computation results;

determining a gradient distance loss representing a distance between the noise-laden backpropagation gradient and the surrogate backpropagation gradient;

training the surrogate submodel by optimizing the gradient distance loss; and computing an updated dummy label using the first submodel and a trained surrogate submodel, the updated dummy label representing a prediction of the label of the second submodel, wherein the first submodel and the trained surrogate submodel are deployed at a first computing device, and the second submodel is deployed at a second computing device.

2. The method of claim 1, wherein the first submodel is trained at the first computing device with a set of raw data as the input feature of the CNN model, and the second submodel is trained at the second computing device with the label as an output of the CNN model for the input feature.

3. The method of claim 1, wherein the training of the surrogate submodel further comprises optimizing a model training accuracy loss representing a difference between predictions of the surrogate submodel and the dummy label.

4. The method of claim 3, wherein the training of the surrogate submodel further comprises optimizing a knowledge learning loss using an auxiliary set of raw data with known labels as the input feature, the knowledge learning loss being determined based on the gradient distance loss and the model training accuracy loss for the auxiliary set of raw data with known labels.

5. The method of claim 4, wherein the training of the surrogate submodel further comprises optimizing an overall learning loss as a function of the gradient distance loss, the model training accuracy loss, and the knowledge learning loss.

6. The method of claim 1, wherein the optimizing of the gradient distance loss further comprises converging the surrogate backpropagation gradient to the noise-laden backpropagation gradient using a gradient-based algorithm.

7. A non-volatile computer-readable medium having computer-executable instructions stored thereon that, upon execution, cause one or more processors to perform operations comprising:

receiving, by a first model, a noise-laden backpropagation gradient from a neural network model in a split learning system, wherein the neural network model has a label, the noise-laden backpropagation gradient is obtained by the neural network model with respect to intermediate computation results received from the first model, wherein the noise-laden backpropagation gradient is formed by adding noise to the label of the neural network model or by adding noise to an original backpropagation gradient from the neural network model, and the intermediate computation results are generated by the first model based on an input feature;

initializing a surrogate model to have a same model architecture as the neural network model, wherein the surrogate model has a dummy label as a ground truth output for the surrogate model, and the dummy label of the surrogate model has continuous values;

training the surrogate model to mimic the neural network model, comprising:

determining a gradient distance loss representing a distance between the noise-laden backpropagation gradient and a surrogate backpropagation gradient, wherein the surrogate backpropagation gradient is determined by the surrogate model with respect to the intermediate computation results; and optimizing the gradient distance loss to converge the surrogate backpropagation gradient from the surrogate model to the noise-laden backpropagation gradient from the neural network model; and computing an updated dummy label using a trained surrogate model, the updated dummy label representing a prediction of the label of the neural network model, wherein the first model and the trained surrogate model are deployed at a first computing device, and the neural network model is deployed at a second computing device.

8. The non-volatile computer-readable medium of claim 7, wherein training the surrogate model further comprises optimizing a model training accuracy loss representing a difference between predictions of the surrogate model and the dummy label.

9. The non-volatile computer-readable medium of claim 8, wherein the training of the surrogate model further comprises optimizing a knowledge learning loss using an auxiliary set of raw data with known labels as the input feature, the knowledge learning loss being determined based on the gradient distance loss and the model training accuracy loss for the auxiliary set of raw data with known labels.

10. The non-volatile computer-readable medium of claim 9, wherein the training of the surrogate model further comprises optimizing an overall learning loss as a function of the gradient distance loss, the model training accuracy loss, and the knowledge learning loss.

11. A computing device, comprising:

at least one processor; and at least one non-volatile computer-readable medium that, when executed, causes the at least one processor to perform operations comprising:

receiving, by a first submodel of a composite neural network (CNN) model, a noise-laden backpropagation gradient from a second submodel of the CNN model, wherein the second submodel has a label, and the noise-laden backpropagation gradient is obtained by the second submodel with respect to intermediate computation results received from the first submodel, wherein the noise-laden backpropagation gradient is formed by adding noise to the label of the second submodel or by adding noise to an original backpropagation gradient from the second submodel, and the intermediate computation results are generated by the first submodel based on an input feature;

initializing a surrogate submodel to have a same model architecture as the second submodel, wherein the surrogate submodel has a dummy label as a ground truth output for the surrogate submodel, and the dummy label of the surrogate submodel has continuous values;

receiving, by the surrogate submodel, the intermediate computation results from the first submodel and determining a surrogate backpropagation gradient with respect to the intermediate computation results;

determining a gradient distance loss representing a distance between the noise-laden backpropagation gradient and the surrogate backpropagation gradient;

training the surrogate submodel by optimizing the gradient distance loss; and computing an updated dummy label using the first submodel and a trained surrogate submodel, the updated dummy label representing a prediction of the label of the second submodel, wherein the first submodel and the trained surrogate submodel are deployed at a first computing device, and the second submodel is deployed at a second computing device.

12. The computing device of claim 11, wherein the first submodel is trained at the first computing device with a set of raw data as the input feature of the CNN model, and the second submodel is trained at the second computing device with the label as an output of the CNN model for the input feature.

13. The computing device of claim 11, wherein the training of the surrogate submodel further comprises optimizing a model training accuracy loss representing a difference between predictions of the surrogate submodel and the dummy label.

14. The computing device of claim 13, wherein the training of the surrogate submodel further comprises optimizing a knowledge learning loss using an auxiliary set of raw data with known labels as the input feature, the knowledge learning loss being determined based on the gradient distance loss and the model training accuracy loss for the auxiliary set of raw data with known labels.

15. The computing device of claim 14, wherein the training of the surrogate submodel further comprises optimizing an overall learning loss as a function of the gradient distance loss, the model training accuracy loss, and the knowledge learning loss.

16. The computing device of claim 11, wherein the optimizing of the gradient distance loss further comprises converging the surrogate backpropagation gradient to the noise-laden backpropagation gradient using a gradient-based algorithm.

* * * * *